April 7, 1970   R. P. TORR   3,504,900
RUBBER SPRINGS

Filed Oct. 11, 1967   4 Sheets-Sheet 1

INVENTOR
RALPH PERCIVAL TORR
BY
*Linton and Linton*
ATTORNEYS

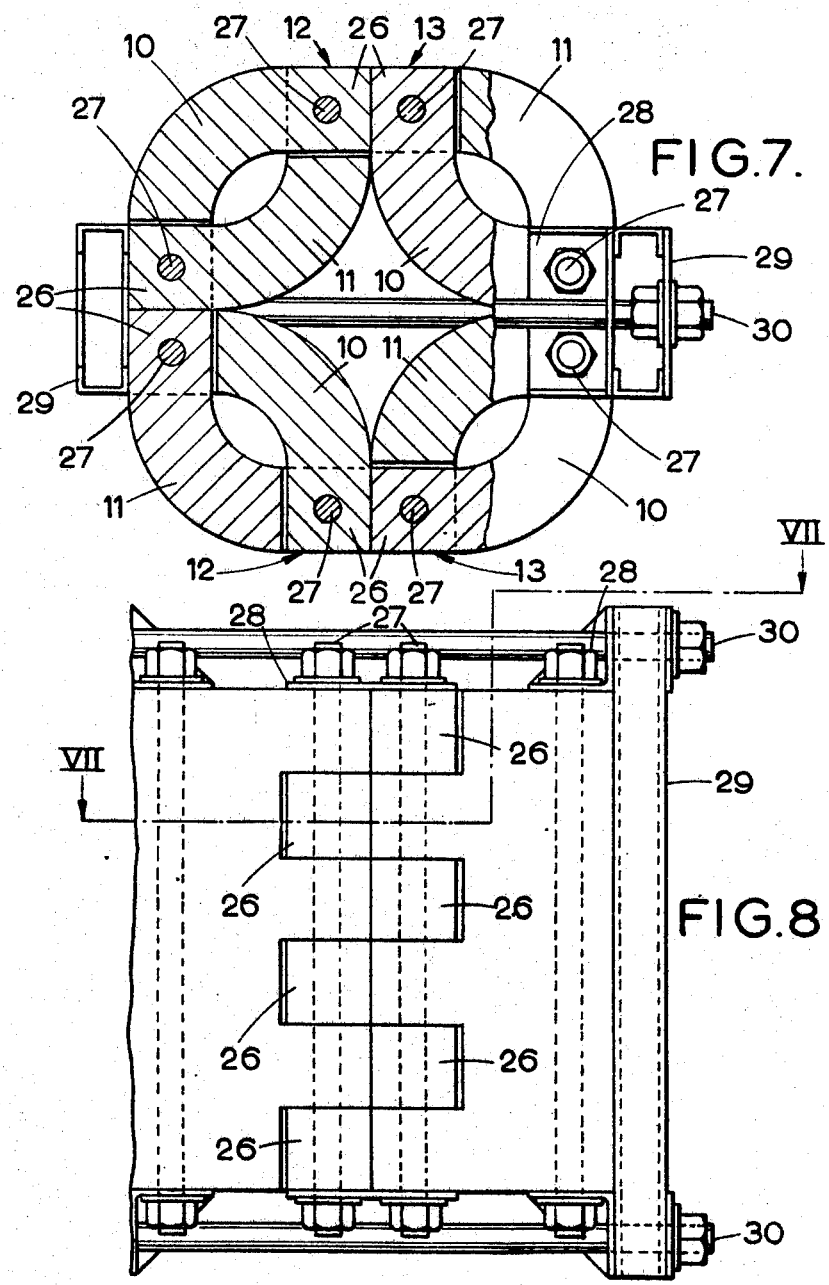

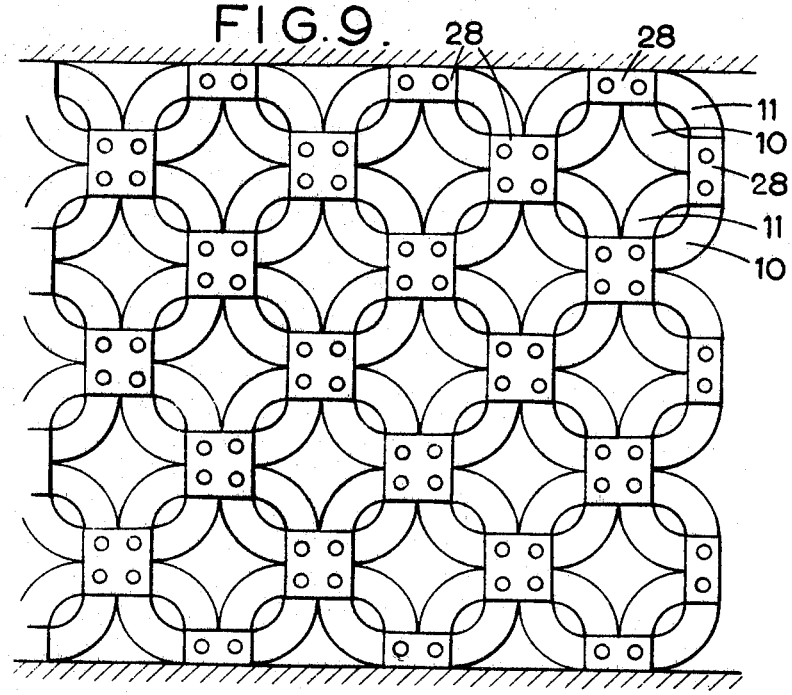
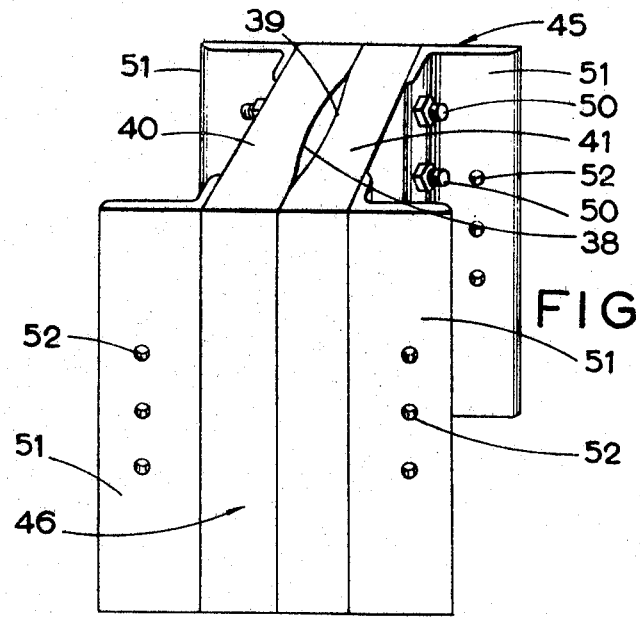

United States Patent Office 3,504,900
Patented Apr. 7, 1970

---

3,504,900
RUBBER SPRINGS
Ralph Percival Torr, New Malden, England, assignor to Andre Rubber Company Limited, Kingston-By-Pass, Surbiton, Surrey, England, a British company
Filed Oct. 11, 1967, Ser. No. 674,561
Claims priority, application Great Britain, Oct. 18, 1966, 46,552/66
Int. Cl. F16f *1/40*
U.S. Cl. 267—1          10 Claims

ABSTRACT OF THE DISCLOSURE

A rubber spring unit for use in association with other spring units as a dock fender, said unit comprising a rubber body having two oppositely arcuate arms defining a pointed elliptical hole. The arms are attached at their end portions which provide an outer surface having two or more perpendicular planar faces secured in area contact with load bearing plates. Compressive loading applied through said plates causes the arms to bend outwardly while the end portions remain relatively unstressed and undeflected, thereby minimising the likelihood of tearing at the angled corners of the ellipse and facilitating reliable attachment of the end portions to the plates.

---

This invention relates to springs made of rubber-like material, particularly but in no way exclusively, to rubber springs adapted to be used as fenders between a ship and a quay when the ship comes alongside.

At the present time rubber springs which are used for this purpose take a variety of forms. Typical examples include rubber springs in a tubular form of either circular cross-section or D-shaped cross-section, which are arranged to be suspended over the side of the quay and to be squashed as a ship comes alongside to provide a resilient fender. With increase in the size of ships, particularly the new oil tankers which at present exceed a hundred thousand tons, and in the future are expected to reach as much as three-hundred thousand tons, it has been found that it is necessary to provide larger fenders which can absorb the extra energy to be dissipated when these large ships come along side a quay. With rubber springs of present design, this has meant making springs of larger and larger size and cross-sectional area, and further progress in this direction is hampered by the fact that it is extremely difficult to secure uniform curing of such large cross-section rubber articles with consequent high manufacturing costs and unreliability.

It is therefore an object of the present invention to provide a rubber spring which can be built up to a desired energy dissipation capacity, while being assembled from rubber components of small size cross-section which are more easily cured.

Accordingly the present invention provides a spring unit having two ends between which it is adapted to receive a load resiliently, comprising two arms of natural or synthetic elastomeric material, said arms extending, side by side between said ends, along the depth of the spring unit and being attached together at each said end, and the adjacent faces of both said arms being formed arcuately so as to enclose an open space therebetween.

According to another aspect of the invention there is provided a spring assembly made up from a plurality of such spring units.

Figure 1:
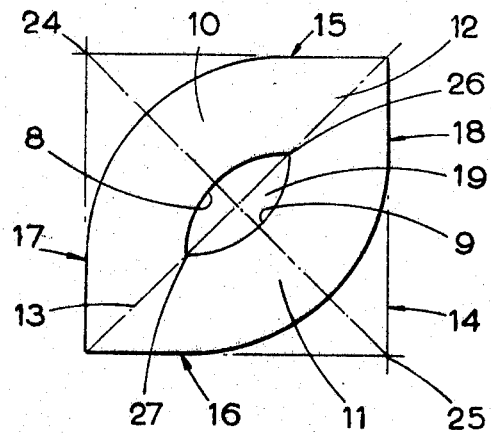
Figure 2:
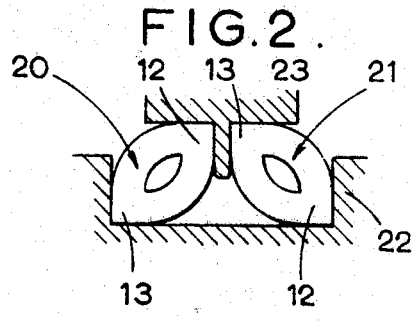
Figure 3:
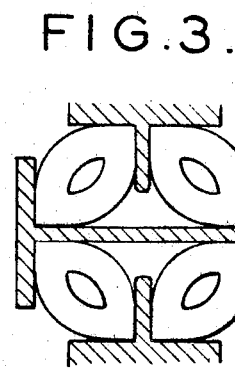
Figure 4:
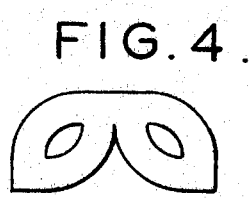
Figure 5:
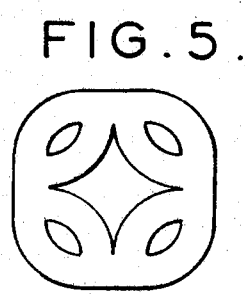
Figure 6:
Figure 10:
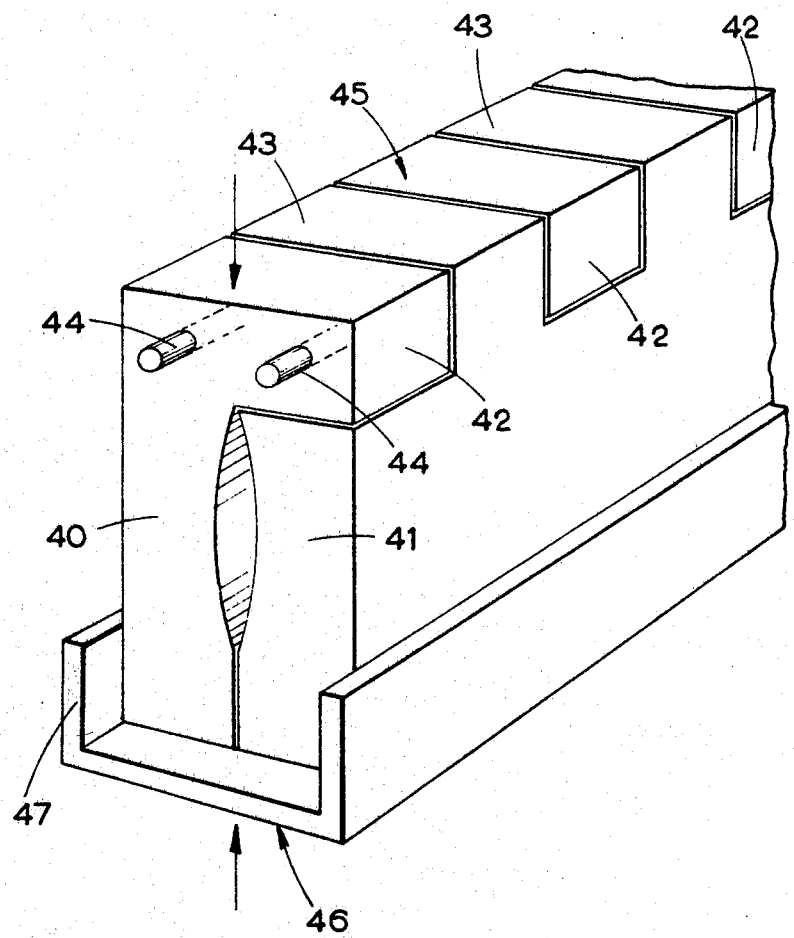

In order to promote a fuller understanding of the invention an embodiment will now be described, by way of example only, with reference to the accompanying drawings of which, FIGURE 1 shows a basic spring unit of the invention, FIGURE 2 shows an arrangement incorporating two basic units of FIGURE 1, FIGURE 3 shows an arrangement incorporating four basic units of FIGURE 1, FIGURE 4 shows an arrangement where two basic units of FIGURE 1 are joined together, FIGURE 5 shows an arrangement where four basic units of FIGURE 1 are joined together, FIGURE 6 shows an arrangement where six basic units of FIGURE 1 are joined together, FIGURE 7 shows a part sectional view, taken on the line VII—VII of FIGURE 8, of an assembly incorporating four basic units of FIGURE 1 with a different construction, FIGURE 8 is a part side view of the assembly of FIGURE 7, FIGURE 9 is a schematic end view of a multiple assembly similar to that of FIGURE 7, FIGURE 10 shows an alternative basic spring unit, and FIGURE 11 shows an alternative constructional arrangement of the spring unit of FIGURE 10.

FIGURE 1 shows in cross-section the basic unit of the rubber spring of the invention. Considered in more detail the cross-section as shown in FIGURE 1 comprises two arms 10 and 11 which extend side by side between the ends or corner portions 12 and 13 and which have their adjacent faces and outer faces formed arcuately. The arms 10 and 11 are so arranged that as their outer faces approach the corner portions 12 and 13, they have flattened portions which coincide with the sides 15, 16, 17 and 18 of the imaginary rectangle 14 (which is preferably a square) that may be super-imposed over the cross-section. The open space 19 enclosed between the adjacent faces 8 and 9 of the arms 10 and 11 is approximately elliptical in cross-section.

In use the load is applied to this spring unit between those parts of the outside faces of the arms 10 and 11, which correspond with the faces 15 and 16 or 17 and 18 of the imaginary rectangle 14. A typical example of the application of load to the basic spring unit is shown in FIGURE 2. Here there are shown in cross-section two basic spring units 20 and 21 which extend in depth into the paper, in operation between a fixed member 22, which may for instance be a quay, and a member 23, which may for instance form part of a fender movable relative thereto. The corner portions 12 and 13 of each of these spring units 20 and 21 are each restrained along their depth in right-angled seatings of the members 22 and 23.

As the member 23 is loaded towards the member 22 by a ship coming alongside, the basic spring units 20 and 21 deflect resiliently. The manner in which they deflect is an important feature of the invention and can be best described by reference to FIGURE 1. If one considers the spring unit shown in FIGURE 1 to be in the position of spring unit 20 in FIGURE 2, then as the member 23 of FIGURE 2 moved towards the member 22, the effect is to move side 15 of the imaginary rectangle 14 of FIGURE 1 towards the side 16, thereof. The sides 17 and 18 of rectangle 14 remain substantially as shown. Thus in effect the imaginary rectangle 14 is distorted towards a more oblong shape. As a result of this the arms 10 and 11 are subject to bending stress and tend to bow outwards towards the corners 24 and 25 respectively of the imaginary rectangle 14.

As this happens it can be seen that the angle between the outer faces of the arms 10 and 11 where they meet at the corner portions 12 and 13 and which in the free state is substantially a right angle, remains virtually unchanged. Further the angle between the inside adjacent faces 8 and 9 of the arms 10 and 11 where these faces meet at the inner corners 26 and 27, which in the free state is again substantially a right angle, again remains virtually unaltered opening out only by a small amount during deflection and the inner aperture 19 approaches a rectange. As a result of these features the stresses within the material of the springs are concentrated predominantly in the arms 10 and 11 as bending stresses, and the ends or corner portions 12 and 13 are subject to predominately compressive stresses.

This results in two important advantages of spring units to this design. Firstly the necessarily small radius corners 26 and 27 of the inner open space 19 are not subject to high stresses, and therefore the small corner radius at this point is not detrimental to the ultimate stress capabilities or the fatigue life of the spring. Secondly if as is often the case with rubber springs, it is desirable to bond metal parts onto the material of the spring to assist in its attachment to other members, with springs of this embodiment such metal parts would be bonded onto the ends or corner portions 12 and 13 along the faces where they correspond with the sides of the rectangle 14. The fact that the load bearing ends or corner portions 12 and 13 are not subject to high stresses or deflections, enhances the life of such bonding and also enables the spring unit to take higher loads without destroying the bond than is possible with spring of more conventional design.

The characteristics described above continue even when the spring is compressed solid with the inner adjacent faces 8 and 9 of the arms 10 and 11 in contact with one another, at which time the inner open space 19 is distorted into a generally straight closed line perpendicular to the compressive force applied. Once this point is reached further deflection can take place after the manner of a solid rubber block. A graph of deflection against load for spring units for this type shows an approximately linear relationship between load and deflection for small loads, the curve of which steepens as heavier loads are applied towards the point where the open space 19 disappears and the spring reaches a solid state. The gradient increases rapidly from this point and corresponds generally to that for a solid rubber spring.

Thus it can be seen that for a given size of spring, the basic spring unit of the invention provides a spring with a good load to deflection relationship until the point where it becomes solid, and at the same time provides a spring which will withstand massive over-loading without endangering the material or construction of the spring.

The two arms 10 and 11 of the basic unit shown in FIGURE 1 are formed together in one piece, by means of moulding, extension or other suitable process.

The basic units of the spring may be utilized in a variety of ways, one of which has been described with reference to FIGURE 2. FIGURE 3 shows a very similar arrangement wherefor basic units are used in a manner which is basically two arrangements as FIGURE 2, placed back to back. FIGURE 4 shows an arrangement where two basic spring units of FIGURE 1 are moulded or extruded in one piece to form a unit which will serve a very similar purpose to that shown in FIGURE 2. FIGURE 5 is a similar arrangement with four basic units of FIGURE 1, and FIGURE 6 is again an arrangement of six basic units of FIGURE 1, moulded or extruded in one piece. In each of the embodiments shown in FIGURES 4, 5 or 6 the loading of the spring is arranged vertically as shown in the figures, and for the best results it is important to restrain the tendency of the spring units to expand sideways as seen in the figures.

FIGURE 7 shows an assembly of four basic spring units similar to that of FIGURE 1 but of a slightly different construction. The fact that the ends or corner portions 12 and 13 of the basic unit of FIGURE 1 come under comparatively low stresses during loading, can be taken advantage of by making the basic spring unit in two pieces attached together. These two pieces are in effect the arms 10 and 11 of FIGURE 1, arranged with interlocking projections 26 forming their ends or corner portions as shown in FIGURES 7 and 8. The interlocking projections 26 on the arms 10 and 11 are held together by means of a pin 27 extending therethrough along the depth of the spring, suitable holes being provided in the interlocking projections 26. Further in the assembly shown in FIGURE 7 fish plates shown by example at 28 are provided fitting over the pins 27 at either end of the assembly to attach the four basic spring units thus formed together into one spring assembly. These fish plates 28 are retained by means of nuts threaded onto the ends of the pins 27. Further as seen in FIGURES 7 and 8, in order to provide the necessary side-ways restraint mentioned above, a rigid beam 29 is provided along the depth of each side of the assembly, and the two beams 29 are held together by bolts 30 extending between them at each end of the assembly. In this manner it can be seen that a spring assembly can be built up which is arranged to be loaded vertically, as seen in FIGURE 7, and which can be assembled from comparatively small and convenient rubber parts.

The action of a spring assembly of this kind is identical with the action described for the basic spring unit of FIGURE 1 and the load deflection characteristics substantially follow known criteria, that is to say that the rate of the spring assembly will be governed by the number of basic spring units used in parallel (in the arrangement of FIGURES 7 and 8 there being 2) and the total deflection available before this spring goes solid will be proportional to the number of basic spring units used in series (in the arrangements of FIGURES 7 and 8 there also being 2).

If larger load capacities and total deflections are required, it is possible to build up the basic spring units into an assembly which gives the desired characteristics. FIGURE 9 shows an example of how this may be done using the fish plates 28 to link the basic spring unit together into one assembly. In this manner it is possible to produce very large capacity rubber springs while still only using small easily manufactured rubber components.

FIGURE 10 shows an alternative arrangement of a rubber spring of the invention in which the basic spring unit of FIGURE 1 is slightly modified. The two arcuate arms 10 and 11 of FIGURE 1 are replaced by the two arms 40 and 41 with adjacent faces 38 and 39 formed arcuately to enclose an open space 37 between them, and with their outer faces flat. The arms 40 and 41 are attached together at the top and bottom ends. One method of doing this is shown at the top in FIGURE 10 where the arms are provided with interlocking projections 42 and 43 respectively, and the projections 42 and 43 are retained in their interlocking position in the manner shown for the previous arrangements by means of pins 44 extending along the depth of the spring. Load is applied to the spring units of this arrangement between the upper and lower end faces 45 and 46 as shown in FIGURE 10. Under load the arms 40 and 41 bow resiliently outwards and again are subjected to substantially bending stresses. Assemblies of these spring units can be built up in a manner as described for the previous arrangement.

It is in order to ensure that the arms 40 and 41 bow outwardly away from one another, rather than both tending to bow inwards or in the same direction, that the inner adjacent faces 34 and 39 of the arms 40 and 41 are made arcuate in the manner shown in FIGURE 10. This insures that when the arms 40 and 41 are initially compressed as the spring unit is loaded, they are unsymmetrically stressed and therefore tend to bow outward into a bending condition and consequently to again be subjected to substantially only bending stresses.

An alternative method of holding the ends of the arms 40 and 41 together is to insert them together into a fitting channel section 47 so that the flanges of the channel holds the ends of the two arms 40 and 41 together in the manner shown at the bottom of FIGURE 10. With this method of holding the ends of the arms 40 and 41 together, it is not necessary to provide the interlocking projection 42 and 43.

FIGURE 11 shows an alternative constructional arrangement of the spring unit FIGURE 10. Where parts in FIGURE 11 correspond to those in FIGURE 10 in form and function, they are given like reference numerals.

In this constructional arrangement instead of the arms 40 and 41 being arranged to interlock as in FIGURE 10 they are held together at each end by means of studs and nuts indicated at 50. The studs and nuts 50 are also used to attach pieces of angle iron 51 to each end of the spring unit in order to provide a more substantial platform by which the spring unit may receive a load. The angle irons 51 may also be provided with drillings 52 to enable the spring unit to be attached to those members by which it is loaded in operation.

In either the arrangement of FIGURE 10 or of FIGURE 11, it can be seen that the two arms 40 and 41 can be formed as one piece by moulding or extension, instead of using the methods of attachment for the ends of the arms shown in FIGURES 10 and 11.

Throughout this description reference has been made to the basic units being manufactured from rubber material. It should be understood that this is merely an example, and such units can equally be made of synthetic rubbers, such as neoprene, chloroprene, polyurethane or from other synthetic plastics materials having rubber-like or elastomeric properties. Further for each of the arrangements of the basic spring units of FIGURE 1, practical uses described have been when there are two basic spring units symmetrically opposed sideways about a vertical axis with the outer corners restrained sideways. It should be understood however that where a spring is to be provided between two members which are slidable relative to one another but constrained within a linear path relative to one another it is quite practicable to use one basic spring unit of FIGURE 1 extending between suitably positioned right angled seatings on the two relatively movable members.

Further the above discussion of spring units has been directed to fenders for dock-side quays. It can be seen that the application of each spring unit is not limited to this use, and that in fact basic spring units of the invention can be used singly or in assembly in any application requiring a spring unit of these characteristics. Further the characteristics and qualities of the assemblies of basic spring units can be controlled and varied by building up assemblies from basic units which have been differently cured, with a result that various load deflection characteristics can be achieved.

What is claimed:
1. A spring unit comprising:
    (a) a body of elastomeric material in the form of two arms, each arm having two opposite end portions attached respectively to the corresponding end portions of the other arm;
    (b) the adjacent faces of said arms being oppositely arcuate to define a hole in said body;
    (c) said hole having a cross-section, when the body is not loaded, generally in the form of an ellipse coming substantially to an angle at each end of its major axis where the arms meet said end portions;
    (d) each pair of adjacent said end portions together having an outer surface in the form of at least two substantially planar faces;
    (e) at least two of said planar faces being mutually perpendicular when viewed in the direction of the longitudinal axis of the hole; and
    (f) load bearing plate means secured to each said pair of end portions in area contact with at least two of said planar surfaces, whereby compressive loading applied through said plate means to said spring unit in a direction having a component parallel to the major axis of said ellipse causes said arms to bend outwardly away from one another in a stressed condition while said end portions remain relatively unstressed and substantially undeflected relative to said plate means.

2. A spring unit according to claim 1 including one or more studs and nuts, each said stud extending through said plate means and both end portions of the pertinent pair of end portions to secure said plate means to the end portions.

3. A spring unit according to claim 2 herein each said stud extends through the pertinent paid of end portions in a direction perpendicular to the longitudinal axis of said hole.

4. A spring unit according to claim 2 wherein each said stud extends through the pertinent pair of end portions in a direction parallel to the longitudinal axis of said hole.

5. A spring unit according to claim 1 wherein said plate means at least at one end of the spring unit comprises an open channel member having a base and two side flanges, said side flanges being substantially perpendicular to said base, the pertinent pair of adjacent end portions fitting between and being held by said flanges of said channel member.

6. A spring unit according to claim 2 wherein said plate means at least at one end of the spring unit comprises two girders extending parallel to the longitudinal axis of said hole, said girders having flanges extending in area contact with oppositely facing planar side faces of the two end portions of a pertinent pair and each said stud extends through bores in both said flanges.

7. A spring unit according to claim 1 wherein each said arm and its two associated end portions is formed in one piece by moulding or extrusion.

8. A spring unit according to claim 7 wherein the two end portions of an adjacent pair are provided with mutually interlocking projections spaced along the depth of the spring unit, said projections being held together by one or more pins extending through said projections in the direction of the depth of the spring unit.

9. A spring unit according to claim 1 wherein both said arms and their associated end portions are formed in one piece by moulding or extrusion.

10. A spring unit according to claim 1 wherein the outer face of each said arm is substantially planar.

References Cited
UNITED STATES PATENTS 3,107,377 10/1963 Nathan.
3,109,639 11/1963 Nicolaisen.

FOREIGN PATENTS 1,028,892 5/1966 Great Britain.

JAMES B. MARBERT, Primary Examiner